Feb. 27, 1923.
C. J. CARLSON.
CONVERTIBLE AUTOMOBILE BODY.
FILED NOV. 6, 1920.

Inventor

C. J. Carlson

By Lacey & Lacey, Attorneys

Feb. 27, 1923. 1,446,833.
C. J. CARLSON.
CONVERTIBLE AUTOMOBILE BODY.
FILED NOV. 6, 1920. 11 SHEETS—SHEET 3.

Inventor
C. J. Carlson
By Larry & Loeus Attorneys

Feb. 27, 1923.
C. J. CARLSON.
CONVERTIBLE AUTOMOBILE BODY.
FILED NOV. 6, 1920.

Inventor
C. J. Carlson
By
Lacy & Lacy, Attorneys

C. J. CARLSON.
CONVERTIBLE AUTOMOBILE BODY.
FILED NOV. 6, 1920.

Inventor
C. J. Carlson

By Lacey & Lacey, Attorneys

C. J. CARLSON.
CONVERTIBLE AUTOMOBILE BODY.
FILED NOV. 6, 1920.

Inventor
C. J. Carlson

By
Lowry & Lacey, Attorneys

Patented Feb. 27, 1923.

1,446,833

UNITED STATES PATENT OFFICE.

CHARLES J. CARLSON, OF HELENA, MONTANA.

CONVERTIBLE AUTOMOBILE BODY.

Application filed November 6, 1920. Serial No. 422,230.

*To all whom it may concern:*

Be it known that I, CHARLES J. CARLSON, citizen of the United States, residing at Helena, in the county of Lewis and Clark and State of Montana, have invented certain new and useful Improvements in Convertible Automobile Bodies, of which the following is a specification.

This invention relates to an improved convertible body for motor vehicles and has as one of its principal objects to provide a body structure which will be neat and graceful in appearance and which may be employed in connection with a chassis of substantially any conventional design.

The invention has as a further object to provide a body structure convertible to form a roadster having either a closed or open rumble compartment.

A further object of the invention is to provide a body structure wherein the top closure for the rumble compartment may be arranged to cooperate with said compartment forming a truck body.

A still further object of the invention is to provide a body structure wherein the rear seat employed may be folded to inactive position forming a false floor section for the rumble compartment and wherein the back rest of the rear seat may be folded forwardly to a position out of the way at the front of the rumble compartment lying immediately behind the two front seats employed.

A still further object of the invention is to provide a body structure wherein the back seat and back rest may be readily disposed in active position in the rear of the front seats whereby the body may be converted into a touring car.

The invention has as a still further object to provide a top which may be folded to form a roadster top when the body is used as a roadster body or which may be extended to form a touring car top.

A still further object of the invention is to provide a top which, when the rear seat is disposed in active position, may be supported upon the back frame of the rear seat alone, to provide a victoria top for the rear seat.

Another object of the invention is to provide a body structure wherein, when converted to provide a truck body, said truck body may be employed as a sleeping compartment and wherein the back rest of the rear seat may be swung upwardly and supported in horizontal position to provide a berth.

A still further object of the invention is to provide a body structure wherein the back rests of the front seats may be adjustably inclined to suit the desires of the occupants of said seats and wherein said back rests may be moved to such position that persons may also sleep upon said seats.

And the invention has as a still further object to provide a body structure wherein the front seats may be adjustably tilted vertically, may be moved backwards or forwards, or may be adjustably elevated.

Other and incidental objects will appear hereinafter.

Figures 22, 23, 24:
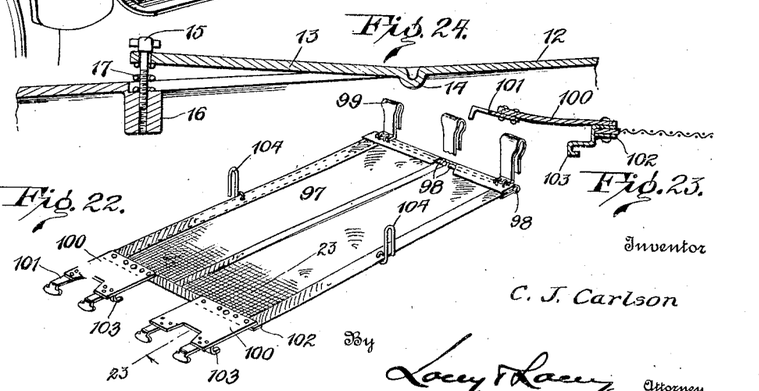
Figure 22 is a detail perspective view showing the stretcher used to form a bed bottom as illustrated in Figure 12.
Figure 23 is a detail sectional view taken on the line 23—23 of Figure 22.
Figure 24 is a detail section taken through one of the ventilators employed upon the engine hood of the vehicle.

Referring now more particularly to the drawings, I have shown my improved vehicle body in connection with a chassis of conventional design. In carrying the invention into effect, the body is formed with sides 10 at the forward end portions of which is the cowl 11 and blending with the lines of the body is the engine hood 12 extending forwardly from the cowl to the engine radiator. This hood is provided at each side thereof with a ventilator 13. As shown in detail in Figure 24, the metal of the hood is pressed inwardly at the inner ends of said ventilators to provide resilient hinge ribs 14 while through the free end portions of said ventilators are loosely engaged headed pins 15 threaded into suitable bosses 16 depending from the under side of the hood. Surrounding these pins are springs 17 normally acting to move the ventilators to open position so that, as will be seen, by adjusting the pins 15, the ventilators may be readily opened or closed.

Figure 7:
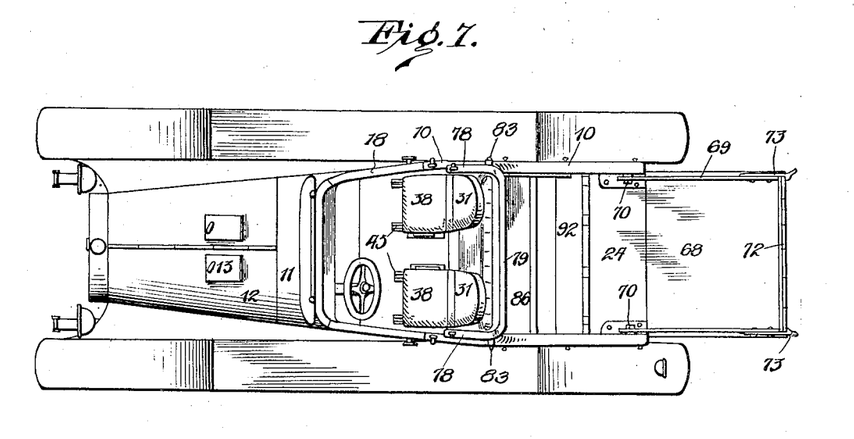
Figure 7 is a plan view of the arrangement shown in Figure 2, the top for the vehicle being detached.
Figure 8:
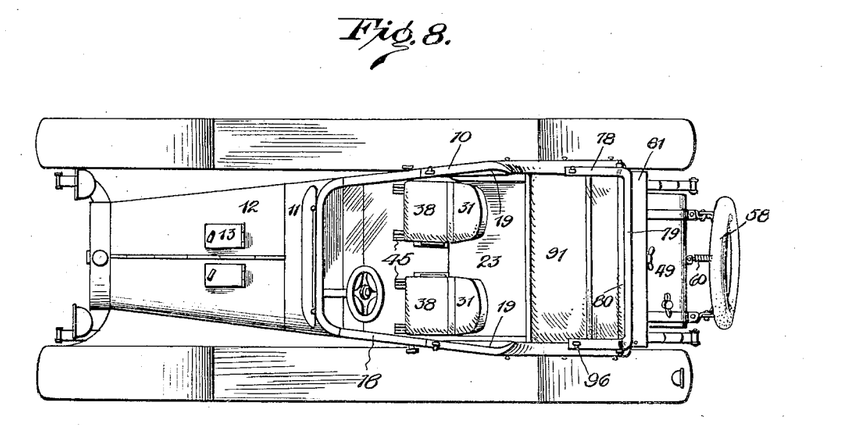
Figure 8 is a plan view of the arrangement shown in Figure 6, the top for the vehicle being detached.

Immediately in the rear of the cowl 11 are provided doors 18 arranged one at each side of the body and which may be opened to permit access thereto. In the rear of the doors, the upper edges of the sides extend horizontally for a short distance flush with the upper edges of the doors and then slope downwardly toward the rear ends of the sides. Formed in the confronting faces of the sides behind the doors are, as clearly shown in Figures 8, 11 and 12, pockets or recesses 19 gradually increasing in depth toward their rear ends and from the rear ends of the pockets the upper margins of the sides of the body are provided at their confronting faces with wear strips 20. At their forward ends these strips are formed with beveled shoulders 21 sloping into the pockets while at the rear ends of said strips are arranged face plates 22 overlying the inner faces of the sides at their rear end portions. Supported by the side bars of the vehicle chassis is the body floor 23 having a raised offset rear end portion 24, the offset in the floor being defined by a cross sill 25, and extending forwardly along the inner faces of the sides are longitudinal sills 26. In front of these sills are mounted the two front seats of the vehicle body which, as shown in Figures 7 and 8, are spaced apart to provide an aisle so that a person may walk between the seats to the rumble compartment of the body at the rear of said seats. The construction and mounting of the seats is particularly brought out in Figures 16 to 19 inclusive of the drawings. As shown in these figures, each of the seats includes a substantially box shaped body 27 which may be formed of sheet metal or other approved material and suitably secured to the body at its rear side is a vertical facing strip 28 projecting above the body. The projecting portion of the strip as well as the rear side thereof are preferably leather covered or otherwise treated to present a neat and attractive appearance and embracing the upper end portion of said strip is a yoke plate 29 provided at its ends with ears 30 engaging the side edges of the strip. The plate 29 may be riveted or otherwise secured to the facing strip and pivoted upon said plate is the back rest 31 of the seat. This back rest is, like the facing strip 28, also preferably leather covered or otherwise treated in a manner similar to the facing strip and secured to the back rest at its side edges are arms 32 overlying the ears 30 of the yoke plate and extending downwardly at the sides of the seat body. Engaged through said arms and through said ears are suitable pivot pins pivotally supporting the back rest. Embracing the seat body is a substantially U-shaped latch 33 through the ends of which are engaged suitable pivot pins extending from the sides of the seat body and pivotally supporting the latch. About one of said pivot pins is engaged a spring 34, one end portion of which is suitably secured to the seat body while the opposite end portion of said spring is arranged to engage beneath the bight of the latch normally pressing the latch upwardly to cooperate with the lower ends of the arms 32 of the back rest. In the sides of the latch are formed series of notches 35 which respectively receive the lower ends of the arms while upon the body of the latch is formed a forwardly projecting lug 36. Thus, as will be at once appreciated, the lug 36 may be engaged for depressing the latch when the back rest may be adjustably tilted upon the seat body when, upon release of the latch, said latch will cooperate with the arms 32 for locking the back rest in adjusted position. Extending around the seat body at its upper open end is a rim 37 slightly overhanging the seat body at its forward side and normally fitting upon this rim is a seat cushion 38 closing the seat body. Thus, as will be seen, the seat body will provide a convenient place in which to carry tools or other desired articles. Arranged in the corners of the seat body 27 are tubular outer posts 39 threaded through the bottom wall of the seat body and secured by straps 40. In their upper ends the outer posts are formed with notches 41 and fitted through said posts are inner posts 42 threaded at their lower end portions to coact with internal threads upon the outer posts. At their lower ends the posts 42 are provided with heads 43 and mounted in the floor of the body at its forward end portion are channel strips 45 slidably receiving said heads. At their upper ends, the posts 42 are formed with squared terminals 46. Consequently, as will be seen, a wrench may be applied to these terminals for rotating the posts 42 until the lower ends of the posts 39 have been lifted out of engagement with the channel strips 45 when the seat may be moved either forwardly or backwardly upon said strips and again fixed in position by counter-rotating the posts 42, it being observed that the posts 39 will coact with the strips for clamping the seat in fixed position. By engaging a wrench in the notches 41 of the posts 39, these posts may be rotated for adjustably elevating the seat while by selectively adjusting either the forward pair of said posts or the rear pair of said posts, the seat may be tilted either forwardly or backwardly.

Figure 20:
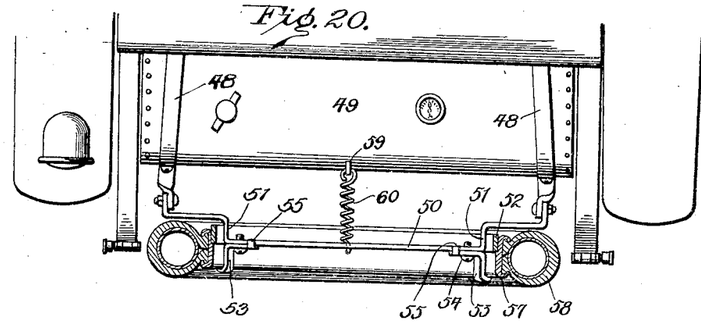
Figure 20 is a fragmentary plan view showing the tire rack employed.

Extending between the side bars of the vehicle chassis at its rear end portion is a cross bar 47 and secured to said cross bar is a pair of spaced brackets 48 which carry a gasoline tank 49 suitably fixed to the brackets to extend transversely therebeneath. The tank may be of any approved construction and projects rearwardly somewhat beyond the rear ends of the sides of the vehicle body. As particularly shown in Figure 20, the brackets also carry a tire holder. This tire holder includes a cross bar 50 pivotally connected at its ends with the rear ends of the brackets and formed with lateral offsets 51. Secured to said offsets is a ring 52 and mounted on the bar to project rearwardly therefrom opposite the offsets are clamps 53. These clamps are secured to the bar by screw bolts or other suitable fastening devices 54 and formed on the inner ends of said clamps are lugs 55 engaging over the upper edge of the bar for holding the clamps against rotation thereon. Secured to the ring at its upper side is, as particularly shown in Figure 9, a rearwardly projecting hook 56 and, of course, the ring is designed to freely receive a spare demountable rim thereover. In the drawings, I have conventionally shown such a rim at 57 which is illustrated as equipped with a tire 58 of conventional construction. As will be appreciated, the rim may simply be engaged over the hook 56 when said rim may be moved inwardly to fit about the ring 52. The fastening devices 54 may then be adjusted for tightening the clamps 53 into engagement with the rim when the rim with its tire will be secured upon the holder. Projecting rearwardly from the tank 49 is an ear 59 and secured at one end to this ear is a spring 60, the opposite end of which is engaged through the bar 50 at a point substantially midway between its ends. This spring will normally exert an upward tension upon the bar and, as will now be observed, the outer end portions of the brackets 48 are twisted to provide shoulders confronting the ends of the bar for limiting the bar in its pivotal movement in either direction under the tension of said spring. Thus, under ordinary circumstances, the spring will serve to sustain the holder supporting the tire in upright position slightly tilted forwardly. However, by grasping the tire, the holder may be swung downwardly to a position beyond the pivotal center thereof, as particularly shown in Figure 12, when the spring 69 will serve to yieldably lock the holder in position supporting the tire tilted rearwardly. The purpose in thus constructing the tire holder will presently appear.

Figure 21:
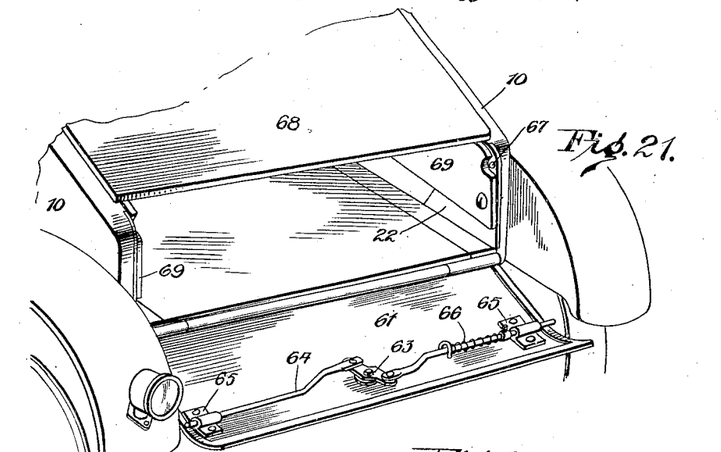
Figure 21 is a detail perspective showing the end gate of the rumble compartment swung open, the tire rack being detached.

Extending between the rear ends of the sides 10 of the vehicle body is a hingedly mounted end gate 61. As particularly shown in Figure 21, the end gate is equipped at a point substantially midway between its ends with a rotatable latch shaft formed at its outer end to provide a knob 62 while to the inner end of said shaft is secured a plate 63. Pivotally connected to this plate are oppositely directed rods 64 which are slidably received through keepers 65 mounted upon the end portions of the end gate. Associated with one of the rods is a spring 66 normally acting to project the rods and, as will now be observed, the face plates 22 at the rear end portions of the sides 10 of the body are provided with suitable openings 67 adapted to receive the free ends of the rods so that when closed, the gate will normally be latched in closed position. Fitting between the sides 10 is a top closure 68 for the rumble compartment of the body. This closure is formed with sides 69 adapted to freely fit between the sides 10 of the vehicle body and freely fitting through the inner ends of said sides are pivot studs 70 threaded through the face plates 22 of the sides 10 for pivotally supporting the closure. As particularly shown in Figure 21, the end edges of the sides 69 of the closure are notched to clear the openings 67 for the latch rods 64 of the end gate while the bottom wall of the closure is arranged to overhang the upper edges of the sides 10 of the body for supporting the closure to incline rearwardly with said edges mating with the end gate when said gate is closed. The exterior surface of the bottom wall of the closure is, of course, finished to conform with the finish of the vehicle body and upstanding from said bottom wall is a pair of spaced handles 71 arranged near the free end of the closure. Hinged upon the bottom wall of the closure at its free end is an end gate 72 fitting freely between the sides 69 of said closure and normally held closed, as particularly shown in Figures 2 and 5, by spring catches 73 mounted upon said sides. As will now be readily seen, the tire holder may, as previously described, be swung downwardly to the position typified in Figure 10, for disposing the tire thereon out of the way when, after opening the end gate 61, the handles 71 may be grasped and the closure 68 swung rearwardly upon the pivot studs 70 to horizontal position forming a truck body at the rear of the rumble compartment of the body of the vehicle. The purpose in hingedly mounting the tire holder now becomes clear and, as will be noted, the inner end edge of the bottom wall of the closure will abut the end edge of the raised portion 24 of the floor of the vehicle body for rigidly supporting the closure in horizontal position. As will be appreciated, this construction provides a convenient arrangement whereby various articles may be carried in the rear portion of the vehicle body.

Figures 9, 15:
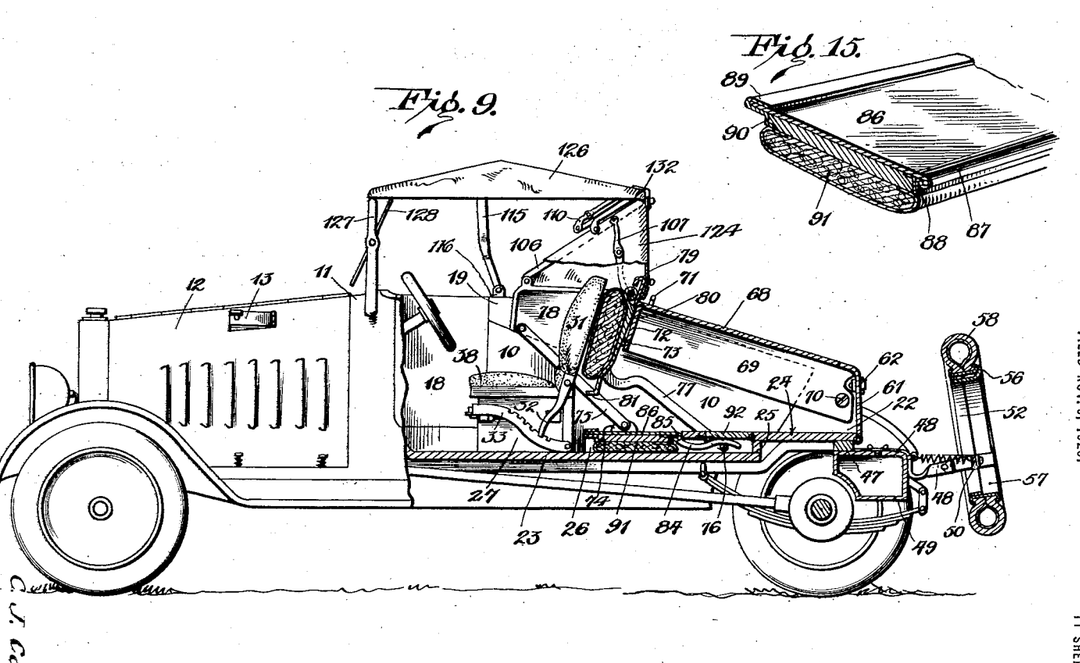
Figure 9 is a fragmentary vertical section taken through the vehicle body when arranged as shown in Figure 1.
Figure 15 is a detail section taken through the rear seat.
Figure 10:
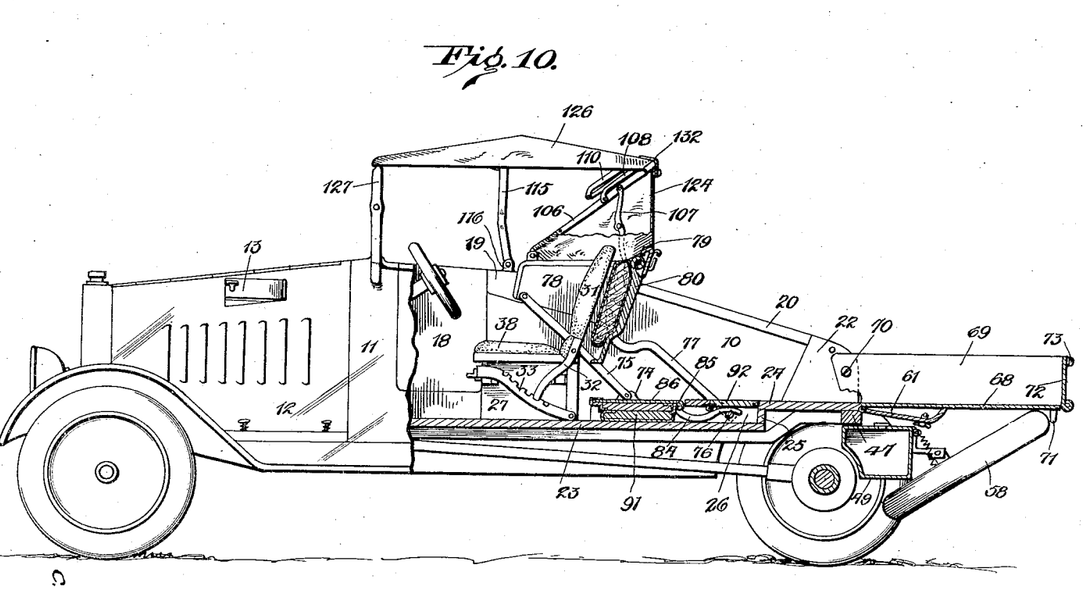
Figure 10 is a fragmentary vertical section taken through the vehicle body when arranged as shown in Figure 2.
Figure 11:
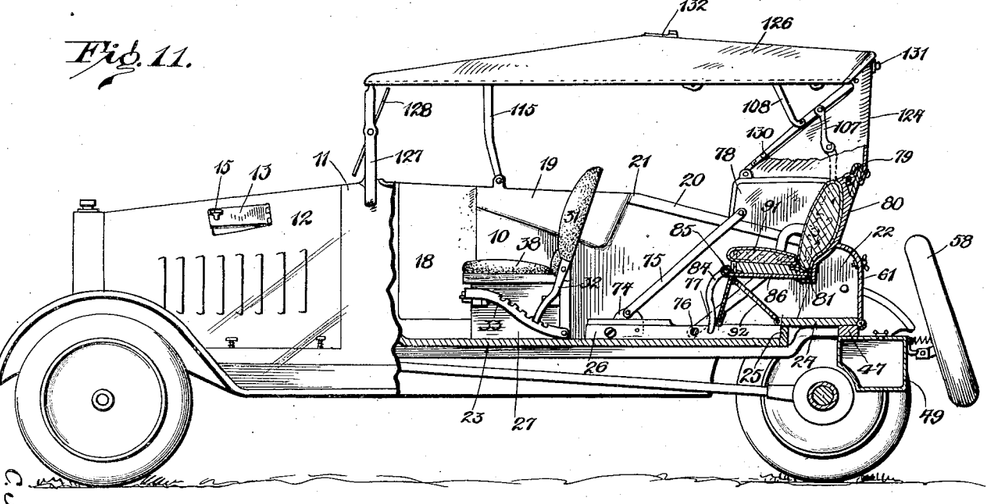
Figure 11 is a fragmentary vertical section taken through the vehicle body when arranged as shown in Figure 6.
Figure 12:
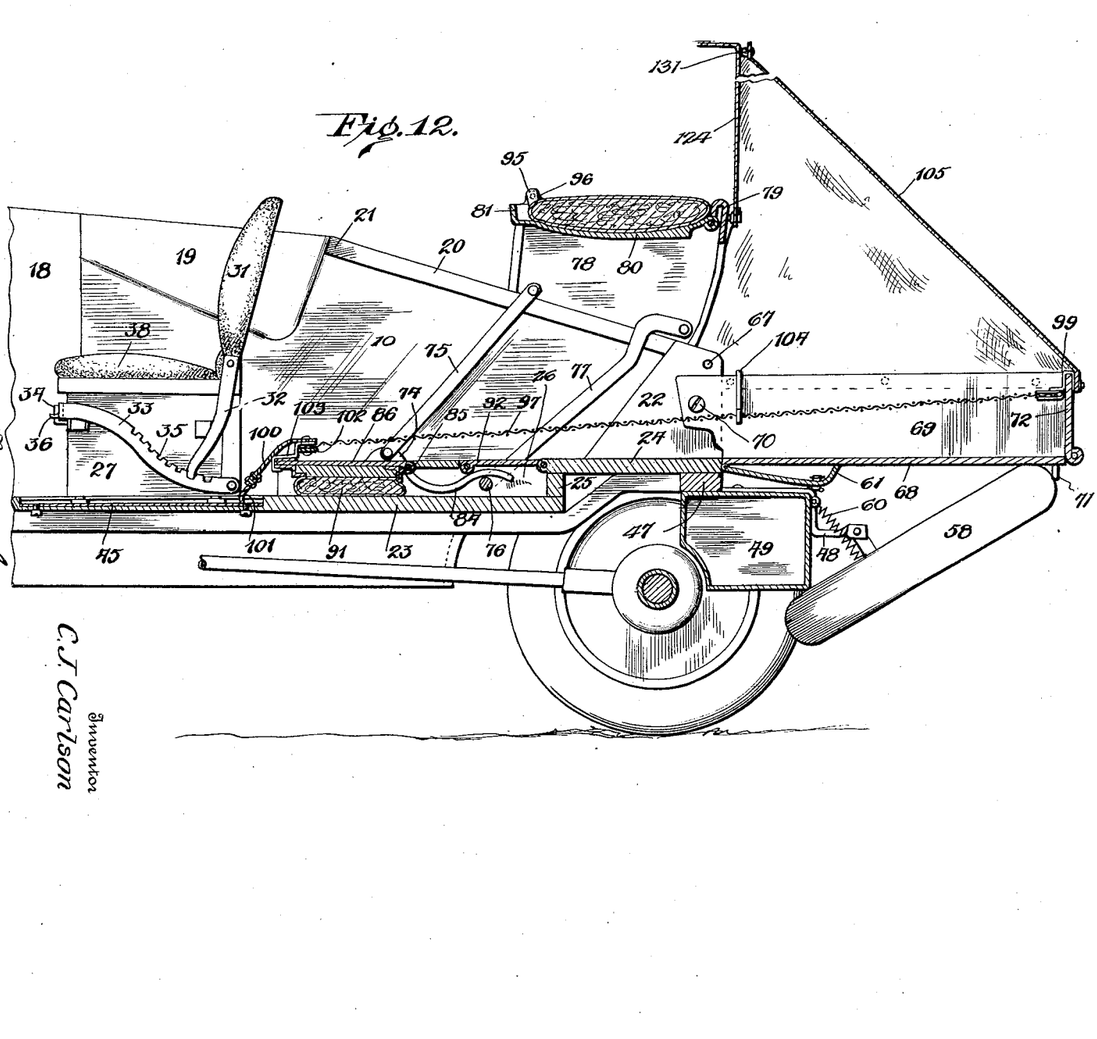
Figure 12 is an enlarged fragmentary vertical section showing the use of the truck body as a sleeping compartment.

Secured to the forward end portions of the sills 26 are, as particularly shown in Figures 9, 10 and 11, upstanding plates 74 to which are pivotally connected arms 75 and extending transversely between said sills in the rear of the plates is a rod 76. Pivotally mounted on said rod are arms 77. Swingingly supported by the arms 75 and 77 is a rear seat frame 78, to the sides of which the arms are pivotally connected and extending between the upper rear portions of the sides of said frame is a cross web 79 preferably integral with and rigidly supporting the sides in spaced relation. Hinged upon said cross web is a back rest 80 provided at its lower end with a forwardly directed flange 81 and as will be observed, the back rest carries a suitable cushion appropriately secured thereto. The frame 78 is of a width slightly greater than the distance between the inner faces of the sides 10 of the vehicle body so that said frame may, as shown in Figure 11, be swung rearwardly to seat the sides of the frame upon the upper edges of the sides 10 sustaining the frame while, by swinging the frame forwardly, the sides thereof may be caused to ride over the beveled shoulders 21 into the pockets 19. The pockets are adapted to freely receive the sides of the frame and in this position of said frame, the back rest 80 will, as shown in Figures 9 and 10, lie immediately behind the back rests 31 of the front seats so that the rumble compartment of the vehicle body will thus be entirely unobstructed. Projecting laterally from the upper edges of the sides of the frame 78 are, as particularly shown in Figure 3, flanges 82 deflected downwardly at their forward end portions to normally engage the upper edges of the sides 10 while from the rear end portions of the sides of said frame project lateral posts 83 which also normally engage the upper edges of the sides 10 for limiting the frame in its forward swinging movement and supporting the sides of the frame within the pockets 19. Pivoted upon the sills 26 in the rear of the rod 76 is a substantially U-shaped hinge member comprising a pair of arms 84 joined by a transverse connecting rod 85. The arms are, at their lower ends, provided with lateral trunnions journaled in the sills while each of said arms is reversely curved so that, as best shown in Figure 12, the hinge member may be swung forwardly to extend over the rod 76 lying below the plane of the upper edges of the sills. Swingingly supported by said hinge member is a rear seat 86. This seat is preferably formed of suitable sheet metal and, as shown in detail in Figure 15, is at its forward margin, bent to provide a hinge loop 87 embracing the rod 85 of the hinge member for swingingly connecting the seat therewith whence the metal of the seat is then again bent to form an upstanding resilient stop flange 88. Embracing the opposite margin of the seat is a channel strip 89, one margin of which is extended and bent up to provide an overhanging retaining flange 90 and engaging beneath said flange to be held by the stop flange 87 is the base of a rear seat cushion 91. This construction provides an arrangement whereby the cushion will be securely held to the seat while, when desired, the cushion may be readily removed, and in this connection it is to be observed that the cushion, while overhanging the flange 90, is still of less width than the seat, the rear margin of the seat being unobstructed. The seat is of a length to overhang the sills 26. However, the hinge loop 87 as well as the flanges 88 and 90 of the seat stop short of the ends thereof so as to be freely received between said sills. Thus the hinge member for the seat may, as shown in Figures 9, 10 and 12, be swung forwardly to lie between the sills when, by coincidently swinging the seat forwardly upon the rod 85 of said hinge member, the ends of the seat may be engaged with the sills supporting the seat in inverted position, the cushion 91 being, of course, carried forwardly with the seat so as to be disposed therebeneath between the sills. Normally filling the space between the seat and the raised portion 24 of the floor of the vehicle body is a counter 92 for the rear seat. As will be observed, this counter is hingedly mounted upon the portion 24 of the floor and is formed of hingedly connected members resting at their ends upon the sills 26 and concealing the arms 84 of the hinge member of the rear seat as well as the rod 76. Thus, when the rear seat is folded to inactive position, as typified in Figures 9 and 10 of the drawings, the counter 92 and said seat will provide a continuation of the raised portion 24 of the body floor, forming the floor of the rumble compartment of the vehicle body.

Figure 1:
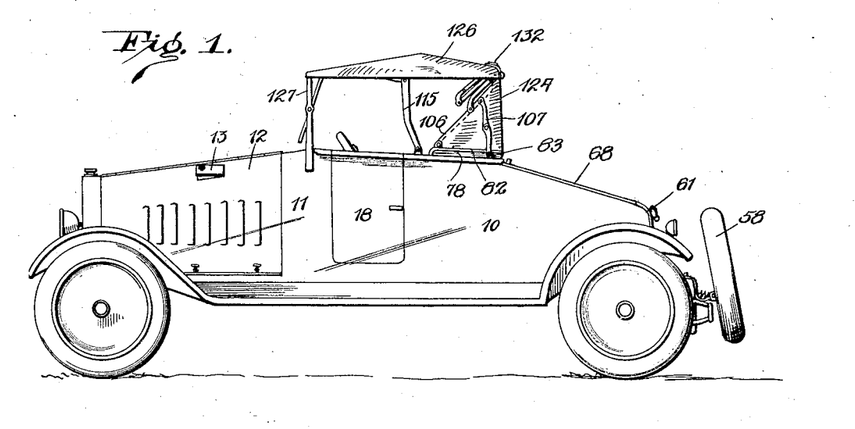
Figure 1 is a side elevation showing a conventional motor vehicle equipped with my improved body, the body being arranged to provide a roadster.
Figure 2:
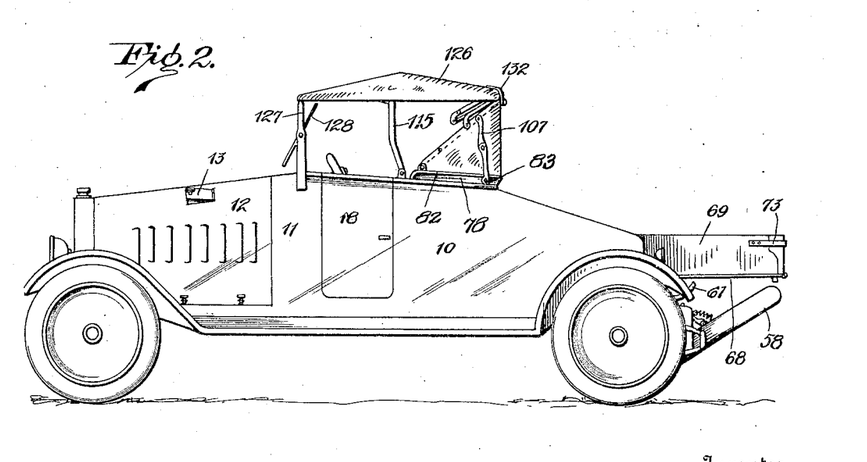
Figure 2 is a view similar to Figure 1, showing the top closure of the rumble compartment of the body swung rearwardly to provide a truck body.
Figure 3:
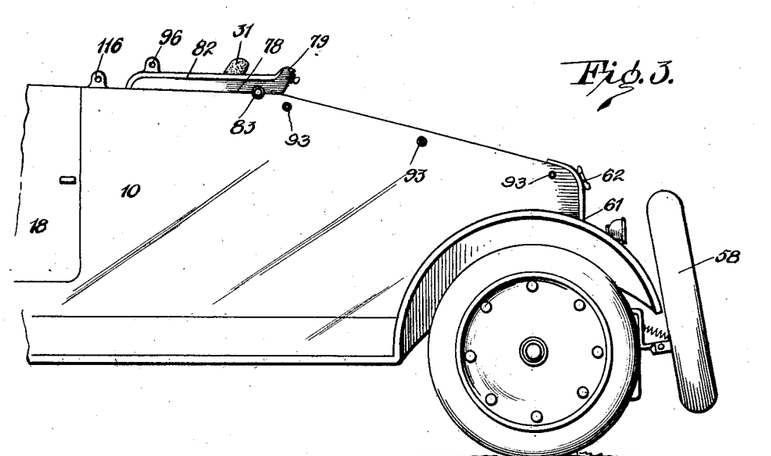
Figure 3 is a fragmentary side elevation showing the top closure for the rumble compartment removed, leaving the rumble compartment open, the top for the vehicle being detached.
Figure 4:
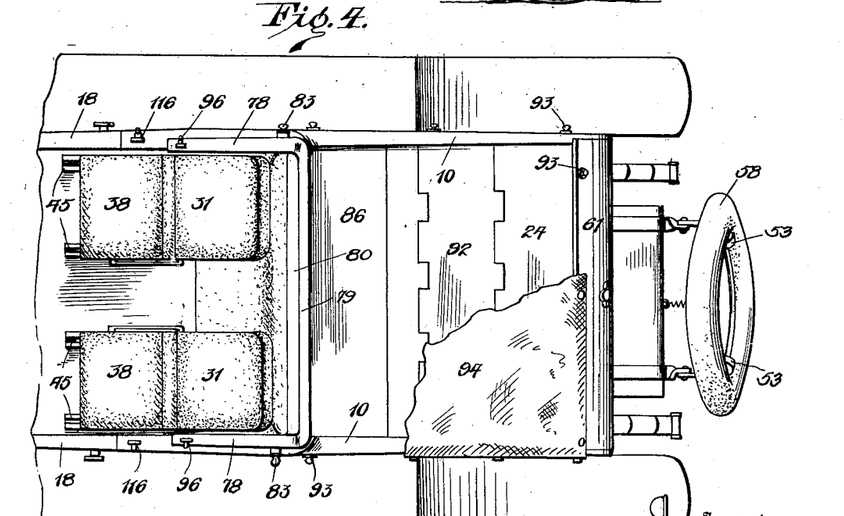
Figure 4 is a fragmentary plan view showing the rumble compartment closed by a fabric cover, the top for the vehicle being detached.
Figure 5:
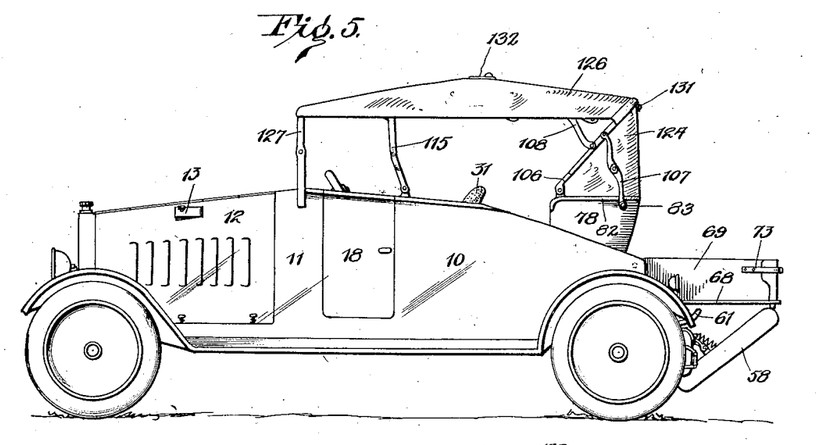
Figure 5 is a side elevation showing the rear seat employed swung to active position whereby to provide a touring body, the truck body being open as shown in Figure 2.
Figure 6:
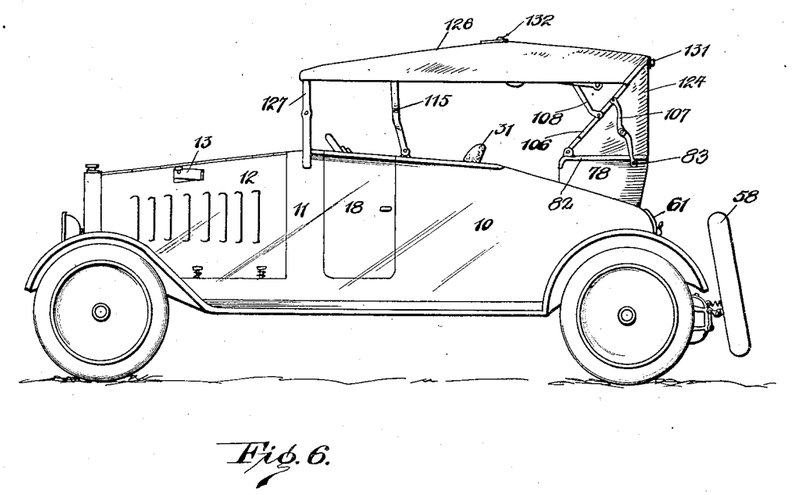
Figure 6 is a side elevation showing the body converted into a touring car having the truck body removed.

As will now be readily understood in view of the preceding description, by folding the top closure 68 of the rumble compartment of the vehicle body forwardly to its normal position and closing the end gate 61, the body may, as shown in Figures 1 and 9 of the drawings, be converted into a roadster body. On the other hand, by swinging the top closure rearwardly as previously described, a truck body, may, as shown in Figures 2, 7 and 10, be provided at the rear portion of the body of the vehicle. If desired, the closure 68 may, by removing the studs 70, be detached, when, as shown in Figures 3 and 4, an open rumble compartment will be provided in the rear portion of the vehicle body. In order that the rumble compartment may be covered over when the closure 68 is thus removed, a plurality of studs 93 are mounted upon the sides of the vehicle body near their sloping rear edge portions as well as along the upper margin of the end gate and a fabric cover 94 is provided, this cover having snaps to removably engage over said studs so that the cover will be held taut overlying the rumble compartment. Accordingly, by the use of the cover, dust and dirt may be prevented from entering said compartment while, when it is desired to gain access to the compartment, the cover may be readily removed. Under normal circumstances, however, the top closure 68 will probably be found desirable and assuming this closure to be attached and the parts in the position shown in Figures 1 and 9, I shall describe the manner in which the body may be converted into a touring body having a truck body at the rear thereof. Initially, the tire holder is, as shown in Figure 5, swung downwardly, as previously described, when the end gate 61 is opened. The top closure 68 is then swung rearwardly to horizontal position when the seat frame 78 is grasped and rocked rearwardly upon its supporting arms 75 and 77 to seat the sides of said frame upon the sloping rear edge portions of the sides 10 of the body. The counter 92 is then swung upwardly and its members folded into overlapping relation to upstand from the raised portion 24 of the floor. The rear seat 86 with its cushion 91 is then swung rearwardly upon its hinge member when the rear margin of said seat is, as particularly shown in Figure 11, engaged with the flange 81 of the back rest 80. The back rest will thus rigidly support the seat at its rear edge while said hinge member will rigidly support the seat at its forward edge, the counter closing the space between the seat and the raised portion 24 of the floor. The rear seat will then be ready for occupancy so that two persons or even three persons may comfortably ride upon the rear seat of the vehicle while two more persons may of course ride upon the front seats of the vehicle. At the same time, luggage or other bundles may be carried within the truck body formed by the top closures 68. If this truck body is not desired, when the body is thus converted into a touring body, the top closure may, as shown in Figures 6, 8 and 11, be removed, the end gate 61 being closed against the back rest 80. The vehicle will then appear as a touring car of pleasing lines.

As is well known, there is an insistent demand for a motor vehicle body of such construction that, when touring from place to place, the occupants of the vehicle may sleep therein. I have accordingly made provision whereby this may be done. Ordinarily, the top closure 68 for the rumble compartment will, as previously indicated, be carried upon the vehicle body and, in Figure 12, I have shown the manner in which a sleeping compartment is provided in the rear portion of the body. Initially, the top closure 68 is, as previously described, swung rearwardly to horizontal position, when the rear seat frame is moved rearwardly and the back rest 80 of said seat swung upwardly between the sides of the frame. Secured to the back rest beneath opposite ends of the cushion thereon, are straps 95 and mounted upon the sides of the rear seat frame at their forward end portions are upstanding brackets 96 with which the straps are engaged for supporting the back rest of the seat in horizontal position. Thus, a person may comfortably sleep upon the cushion of the back rest. By tilting the back rests of the front seats rearwardly as far as possible, a person may comfortably sleep in each of these seats. To provide accommodations for additional persons, I employ a bed bottom 97. As shown in detail in Figure 22, this bed bottom includes a body of canvas or other approved material and secured within a suitable hem at one end of the body are companion reinforcing rods 98 arranged end to end, two rods being employed in order that the body may be folded longitudinally medially thereof. Stitched or otherwise secured to the body and to said rods are supporting hooks 99. At its opposite end, the body of the bed bottom is also provided with a suitable hem and riveted or otherwise secured to this hem at the sides of the body are straps 100. At their outer ends these straps are formed with spaced tabs and riveted or otherwise secured to said tabs are hooks 101 having depending T-shaped heads engageable in the channel strips 45 provided for the front seats of the vehicle body. Overlying the hem of the bed bottom beneath the inner ends of the straps 100 are reinforcing strips 102 secured by the rivets holding the straps and projecting beneath the straps at points midway between the side edges thereof are, as shown in detail in Figure 23, hooks 103 offset downwardly from the straps. The inner ends of these hooks extend beneath the straps and engaged through each of said hooks is on of the rivets holding the straps and the reinforcing strips. At its sides, the bed bottom is also provided with suitable reinforcing hems and stitched or otherwise secured to said hems substantially midway between the ends of the bed bottom are hooks 104. As will now be observed, the hooks 101 are engaged in the rear end portions of the channel strips 45 while the hooks 103 are engaged over the adjacent margin of the rear seat 86, this seat having been previously folded forwardly to inactive position, in the manner previously described, lying between the sills 26. The hooks 104 are then engaged over the sides of the top closure 68 when, by slightly swinging the top closure upwardly the hooks 99 may be engaged over the upper margin of the end gate 72 of said closure. Consequently, when the top closure is returned to its normal position, the bed bottom will be stretched taut supported at its sides by the hooks 104. Blankets, or a mattress, may then be arranged upon the bed bottom to provide a bed upon which two persons may comfortably sleep. Thus, it will be seen that sleeping accommodations may be provided for at least five persons. Extending over the top closure is a canopy 105 enclosing the rear portion of the bed. This canopy may be of canvas or other suitable fabric and is provided at its margins with snaps, the uppermost of which are engaged with suitable studs upon the vehicle top which shall be later described, while the snaps along the lower margins of the canopy are engaged with studs projecting from the upper margins of the sides of the top closure and from the end gate 72 thereof. The rear portion of the bed will thus be housed and protected by said canopy while, of course, the forward position of the bed will be protected by the vehicle top. In this connection it should be observed that the studs on the sides of the top closure are short and clearance for said studs is provided between the sides of the top closure and the sides 10.

Figure 13:
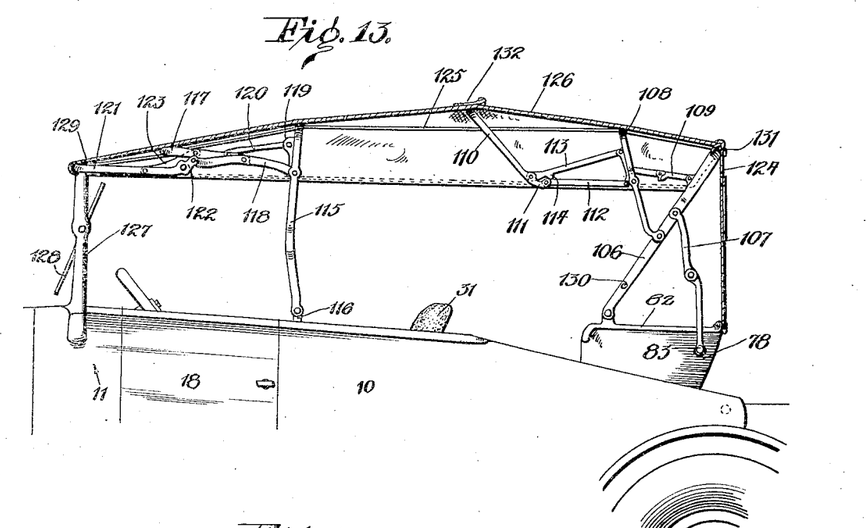
Figure 13 is a side elevation particularly showing the vehicle top as extended to form a touring top.
Figure 14:
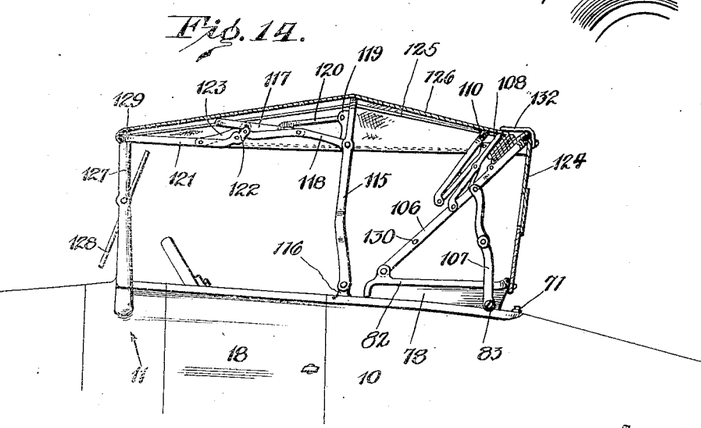
Figure 14 is a similar view showing the top folded to provide a roadster top.
Figure 16:
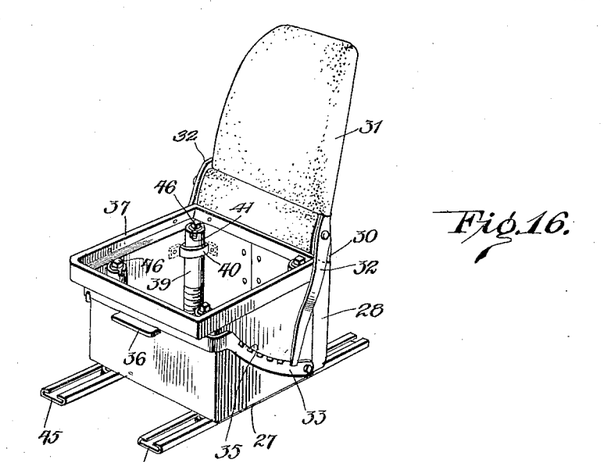
Figure 16 is a detail perspective view showing one of the front seats.
Figure 17:
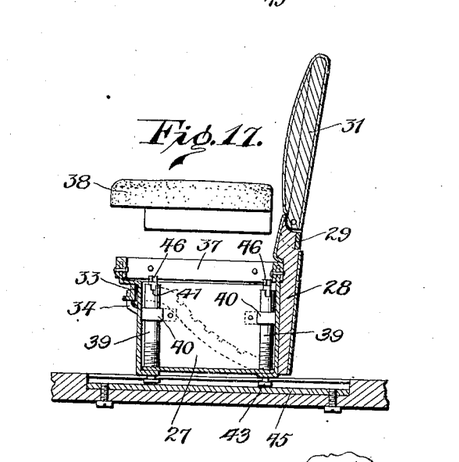
Figure 17 is a detail vertical section taken through one of the front seats.
Figure 18:
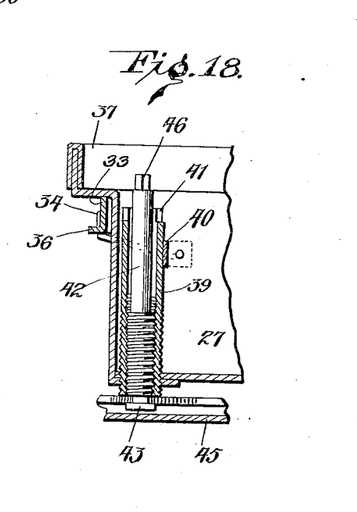
Figure 18 is an enlarged detail section showing the adjusting posts for the front seats.
Figure 19:
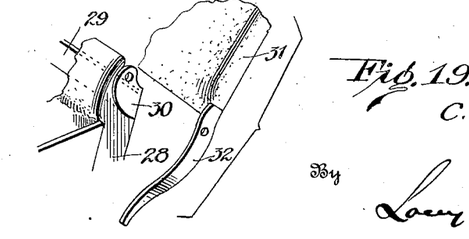
Figure 19 is a detail perspective view bringing out the mounting of the back rests of the front seats.

Coming now to the vehicle top, I employ, as particularly shown in Figures 13 and 14 of the drawings, a rear bow 106, the side arms of which are pivoted at their lower ends upon the brackets 96 and normally supporting said bow are jointed braces 107, the lower ends of which are pivoted upon the posts 83. Mounted upon the rear bow is a rear intermediate bow 108, the side arms of which are pivoted at their lower ends upon the side arms of the rear bow and supporting the intermediate bow with respect to the rear bow are jointed braces 109. These braces extend between the side arms of said bows and are formed with butt hinge joints, the braces being adapted to break downwardly. As will be observed, the intermediate bow is inclined forwardly somewhat and supported by said bow is a rear outrigger bow 110. The side arms of this bow are formed, at their lower ends, with laterally curved terminals 111 and extending between said terminals and the side arms of the intermediate bow 108 are links 112 pivotally connected to the side arms of the intermediate bow below the forward ends of the braces 109. Pivotally connected to the lower end portions of the side arms of the outrigger bow are stop links 113, the rear ends of which are pivotally connected to the side arms of the bow 108 above the forward ends of said braces and formed on the forward end portions of said stop links are depending shoulders or lugs 114. Thus, it will be seen that the outrigger bow is swingingly connected with the intermediate bow and when said outrigger bow is moved to its active position, as shown in Figure 13, the laterally curved terminals 111 of said bow jam against the lugs 114 at their forward edges for limiting said bow in its pivotal movement upon the links 112 and 113 so that the outrigger bow will be rigidly sustained by said links. A front bow 115 is also employed. At its lower ends this bow is removably mounted upon brackets 116 upstanding from the sides of the vehicle body and carried by said bow is a forwardly projecting front intermediate bow 117. Pivotally mounted at their rear ends upon the side arms of the bow 115 are arcuate links 118, the forward end portions of which are deflected upwardly and, as will now be observed, the side arms of the intermediate bow are received between these links and at their inner ends are pivotally connected to the links at points substantially midway between the ends thereof. Above the inner ends of the links 118, the bow 115 is formed with forwardly projecting ears 119 and extending between said ears and the inner end portions of the side arms of the intermediate bow are links 120 limiting said bow in its forward pivotal movement upon the links 118. These links also carry a front outrigger bow 121. The side arms of this bow are, at their inner ends, provided with lateral upwardly deflected terminals 122 which are pivotally connected to the forward ends of said links and extending between the forward end portions of the side arms of the intermediate bow and the rear end portions of the side arms of the outrigger bow are links 123 lying at the inner sides of said arms and pivotally connected thereto. As will be perceived, when the outrigger bow is swung at its forward end to dispose this bow in horizontal active position, the bow will rock upon the links 123 while the terminals 122 of said bow will move upwardly beyond the pivotal centers of the links at their forward ends and beyond the pivotal center of the intermediate bow into engagement with the side arms of this bow so as to lock the outrigger bow in extended position sustained by the links 123. Extending between the rear bow 106 and the rear seat frame 78 is an end curtain 124 and overlying all of the bows are spaced straps or runners 125 located near the side arms of the bows. At their rear ends these straps are secured to the rear bow 106 while the forward ends of the straps are secured to the front outrigger bow 121. Further, the straps are bound to the rear intermediate bow 108, the front bow 115, and the front intermediate bow 117 so that said straps connect all of these bows. Secured at its rear end to the rear bow 106 and at its front end to the front outrigger bow 121, is a top cover 126 supported by the intermediate bows and extending downwardly along the side arms of said bows, the straps 125 serving to support the bends of the cover between the several bows. Upstanding from the cowl 11 of the vehicle body is a wind shield. The frame of this wind shield is formed with vertical sides posts 127 between which is pivotally mounted the transparent shield proper 128, and formed on said posts at their upper ends are outwardly facing hooks 129 normally engaging over the side arms of the front outrigger bow 121 from the inner sides of said arms for not only securing said bow extended but also holding the front bow 115 against rearward pivotal movement and maintaining the top cover 126 taut. By swinging the braces 109 downwardly the rear intermediate bow 108 may, as shown in Figure 14, be swung rearwardly to lie against the rear bow 106. Coincidently, the rear outrigger bow 110 may, as will be readily appreciated, be swung to lie against the intermediate bow. Similarly, the links 118 may be swung downwardly upon the front bow 115, causing the front intermediate bow 117 to swing rearwardly and also rearward swinging of the front outrigger bow 121 so that the intermediate bow and outrigger bow may be moved to lie against the bow 115. Upon the side arms of the rear bow 106 are posts 130. The front bow 115 may be disengaged from the brackets 116 and engaged with these posts so that the front bow will then be supported upon the rear bow. Accordingly, by then folding the braces 107, the complete top may be lowered. Projecting from the rear edge of the rear bow 106 along its upper transverse portion is a plurality of spaced studs 131. When the canopy 105 is employed, as shown in Figure 12, the snaps at the upper end of the canopy are, as previously intimated, engaged with these studs. Secured to the intermediate portion of the top cover 126 is a plurality of transversely spaced tabs 132. These tabs carry snaps which are also engageable with the studs 131 for shortening the effective length of the top cover.

As will now be readily understood in view of the preceding description, the vehicle top can, as may have been anticipated, be converted to form a roadster top or to provide a touring top to meet the requirements of the vehicle body. When the body is converted into a roadster body, as shown in Figures 1 and 9, or when arranged to provide a roadster having a truck body at the rear thereof, as shown in Figures 2 and 10, the top is, as shown in detail in Figure 14, converted into a roadster top. This is done by folding the rear intermediate bow 108 and the rear outrigger bow 110 against the rear bow 106. The snaps of the tabs 132 are then engaged with the studs 131 upon the rear bow for reducing the effective length of the top cover, the portion of the cover between the tabs and rear bow being folded inwardly so that the exterior of the top will present smooth lines. The front bow 115 is as will be noted, engaged with the brackets 116 and when the front outrigger bow is engaged with the hooks 129 upon the posts of the wind shield, the cover will be drawn taut. An attractive roadster top is thus provided and, when desired, suitable curtains may be employed for closing the top at its sides. When the body is converted to provide a touring car body, as shown in Figures 6 and 11, or is arranged to form a touring car body having a truck body at the rear thereof, as shown in Figures 5 and 12, the top is, as illustrated in detail in Figure 13, converted into a touring car top. This is done by simply releasing the tabs 132 so as to permit the top to lengthen as the rear seat frame is swung rearwardly, when the rear intermediate bow 108 and outrigger bow 110 are shifted to active position. Suitable curtains may, of course, be carried for use in conjunction with the side curtains for the roadster top, for completely closing the top when converted into a touring car top. In order to provide a victoria top for the rear seat when this seat is in use, the front bow 115 may, after the rear intermediate bow 108 and rear outrigger bow 110 have been folded, be mounted upon the posts 130 of the rear bow and the snaps of the tabs 132 engaged with the studs 131. Straps may then be arranged to extend between the front outrigger bow and the sides of the vehicle body for holding the top cover taut.

Having thus described the invention, what is claimed as new is:

1. A convertible body for motor vehicles including side walls, a swingingly supported seat frame movable forwardly to inactive position and rearwardly to active position sustained by said walls, a seat to cooperate with said frame, and means normally closing the body in the rear of said frame.

2. A convertible body for motor vehicles including side walls defining a rumble compartment, a swingingly supported seat frame movable forwardly within said compartment to inactive position and rearwardly to active position sustained by said walls, a seat to cooperate with said frame, and a top closure for the compartment normally extending in the rear of said frame.

3. A convertible body for motor vehicles including side walls defining a rumble compartment, a swingingly supported seat frame movable forwardly within said compartment to inactive position lying between said walls and rearwardly to active position resting upon said walls, and a seat to cooperate with said frame.

4. A convertible body for motor vehicles including side walls having pockets, a swingingly mounted seat frame extending between the walls and movable forwardly to inactive position into said pockets and rearwardly to active position resting upon the upper edges of said walls, and a seat to cooperate with said frame.

5. A convertible body for motor vehicles including side walls, a seat frame normally lying between the walls and movable rearwardly to active position sustained by said walls, a back rest carried by the frame, and a swingingly supported seat movable to active position cooperating with the back rest in the active position of said frame.

6. A convertible body for motor vehicles including side walls, a seat frame movable rearwardly to active position sustained by said walls, a back rest carried by the frame, and a swingingly supported seat normally carried inverted within the body and movable to active positions cooperating with the back rest in the active position of said frame.

7. A convertible body for motor vehicles including side walls, a seat frame movable rearwardly to active positions sustained by said walls and having a back rest, and a seat swingingly supported at one margin and movable to active position engaging at its opposite margin with the back rest in the active position of said frame.

8. A convertible body for motor vehicles including side walls, a seat frame movable rearwardly to active position sustained by said walls and having a back rest provided at its lower end with a flange, and a swingingly supported seat movable to active position engaging at its rear margin with said flange in the active position of said frame.

9. A convertible body for motor vehicles including side walls defining a rumble compartment, a seat frame movable rearwardly in said compartment to active position and having a back rest, and a seat normally forming a continuation of the floor of said compartment and movable to active position cooperating with the back rest in the active position of said frame.

10. A convertible body for motor vehicles including side walls defining a rumble compartment, a seat frame movable rearwardly to active position in said compartment and having a back rest, a seat normally forming a continuation of the floor of said compartment and movable to active position cooperating with the back rest in the active position of said frame, and a counter for said seat also normally forming a continuation of said floor.

11. A convertible body for motor vehicles including side walls defining a rumble compartment, arms pivoted at their lower ends within said compartment, a seat frame swingingly supported by said arms and movable rearwardly within the compartment to active position, a back rest carried by the frame, and a seat movable to active position cooperating with the back rest in the active position of said frame.

12. A convertible body for motor vehicles including side walls, a front seat, a swingingly supported seat frame normally lying close behind the front seat and movable rearwardly to active position spaced from said seat, and a pivoted seat normally forming a portion of the floor of said body and movable to cooperate with said frame in the active position of the frame.

In testimony whereof I affix my signature.

CHARLES J. CARLSON. [L. S.]